US011977346B2

(12) United States Patent
Watanabe

(10) Patent No.: US 11,977,346 B2
(45) **Date of Patent: *May 7, 2024**

(54) FIXING DEVICE

(71) Applicant: BROTHER KOGYO KABUSHIKI KAISHA, Nagoya (JP)

(72) Inventor: Tomonori Watanabe, Ichinomiya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/185,495

(22) Filed: Mar. 17, 2023

(65) Prior Publication Data

US 2023/0221666 A1 Jul. 13, 2023

Related U.S. Application Data

(63) Continuation of application No. 17/478,062, filed on Sep. 17, 2021, now Pat. No. 11,624,993, which is a continuation of application No. 17/122,478, filed on Dec. 15, 2020, now Pat. No. 11,137,703.

(30) Foreign Application Priority Data

Dec. 27, 2019 (JP) ................................ 2019-238921

(51) Int. Cl.
*G03G 15/20* (2006.01)

(52) U.S. Cl.
CPC ..... *G03G 15/2053* (2013.01); *G03G 15/2064* (2013.01); *G03G 15/2092* (2013.01); *G03G 2215/2009* (2013.01); *G03G 2215/2032* (2013.01)

(58) Field of Classification Search
CPC .......... G03G 15/2017; G03G 15/2028; G03G 15/2032; G03G 15/2053; G03G 15/2064; G03G 2215/2032
See application file for complete search history.

(56) References Cited

U.S. PATENT DOCUMENTS

| | | | |
|---|---|---|---|
| 8,718,523 | B2 | 5/2014 | Miyoshi |
| 2011/0222874 | A1 | 9/2011 | Yamada |
| 2016/0291514 | A1 | 10/2016 | Fukunaga |

(Continued)

FOREIGN PATENT DOCUMENTS

| | | | |
|---|---|---|---|
| JP | 2011-191445 | A | 9/2011 |
| JP | 2016-224158 | A | 12/2016 |

(Continued)

*Primary Examiner* — Hoang X Ngo
(74) *Attorney, Agent, or Firm* — Merchant & Gould P.C.

(57) ABSTRACT

In a fixing device, a first fixing member and a second fixing member are configured to form a nip in combination, and an arm biased by a first spring with a first biasing force provides a nip pressure. A cam rotatably arranged to cause the arm to move against the first biasing force has a first cam surface used to change the nip pressure from a first pressure to a second pressure smaller than the first pressure, and a second cam surface of which an angle of action is greater than that of the first cam surface to change the nip pressure from the second pressure to a third pressure smaller than the second pressure. A maximum pressure angle at the second cam surface is smaller than a maximum pressure angle at the first cam surface.

14 Claims, 11 Drawing Sheets

(56) References Cited

U.S. PATENT DOCUMENTS

| | | | | |
|---|---|---|---|---|
| 2016/0349684 | A1 | 12/2016 | Tanaka | |
| 2017/0168439 | A1 | 6/2017 | Miki | |
| 2017/0285538 | A1 | 10/2017 | Nishimura | |
| 2019/0094768 | A1 * | 3/2019 | Shinoya | G03G 15/2028 |
| 2019/0332043 | A1 | 10/2019 | Nakabo | |

FOREIGN PATENT DOCUMENTS

| | | | |
|---|---|---|---|
| JP | 2017-227937 | A | 12/2017 |
| JP | 2018-028584 | A | 2/2018 |
| JP | 2018-159809 | A | 10/2018 |
| JP | 2019-066507 | A | 4/2019 |

* cited by examiner

FIXING DEVICE

CROSS-REFERENCE TO RELATED APPLICATIONS

This application is a continuation of U.S. patent application Ser. No. 17/478,062, filed Sep. 17, 2021, now U.S. patent Ser. No. 11/624,993, which is a continuation of U.S. patent application Ser. No. 17/122,478, filed Dec. 15, 2020, now U.S. Pat. No. 11,137,703, which claims priority from Japanese Patent Application No. 2019-238921 filed on Dec. 27, 2019, the disclosures of which are incorporated herein by reference in their entirety.

TECHNICAL FIELD

Apparatuses disclosed herein relate to a fixing device for fixing a developer image on a sheet.

BACKGROUND ART

A nip pressure control mechanism for a fixing device in which a nip pressure between a heater unit and a pressure roller is adjustable is known in the art. Specifically, the nip pressure control mechanism comprises an arm supporting the heater unit, a spring biasing the arm toward the pressure roller, and a cam pushing the arm against the biasing force of the spring. The nip pressure control mechanism is configured to be capable of adjusting the nip pressure to one of a first nip pressure, a second nip pressure smaller than the first nip pressure and a third nip pressure smaller than the second nip pressure.

The cam has a first cam surface contoured to change the nip pressure from the first nip pressure to the second nip pressure, and a second cam surface contoured to change the nip pressure from the second nip pressure to the third nip pressure.

SUMMARY

If the pressure angle between the direction of motion of (or force received by the cam surface from) the arm and the normal to the cam surface at a point of contact of the cam with the arm is too large, undesired advance of the cam surface would occur because the cam is caused to rotate by the biasing force of the spring. Such undesirable advance would be more conspicuous when the biasing force of the spring is greater.

As would be the case with the existing scheme in the art, if the cam surface comprises a first cam surface and a second cam surface where a biasing force of the spring exerted on the second cam surface is greater than a biasing force of the spring exerted on the first cam surface, and the maximum pressure angle of the second cam surface is greater than the maximum pressure angle of the first cam angle, the aforementioned disadvantage of undesirable advance of the cam surface would more likely occur, thereby causing uncomfortable noise to be produced from the cam.

It would thus be desirable to provide a fixing device in which undesired advance of the cam surface by the biasing force of the spring is restrained.

In one aspect, a fixing device is disclosed herein which comprises a first fixing member, a second fixing member and a pressure control mechanism. The second fixing member is configured to form a nip in combination with the first fixing member. The pressure control mechanism is configured to be capable of adjusting a nip pressure to one of a first pressure, a second pressure, and a third pressure. The second pressure is smaller than the first pressure, and the third pressure is smaller than the second pressure. The pressure control mechanism comprises an arm, a first spring and a cam. The arm is configured to provide the nip pressure. The first spring is arranged to bias the arm with a first biasing force. The cam is rotatably arranged to cause the arm to move against the first biasing force. The cam has a first cam surface and a second cam surface. The first cam surface is contoured to change the nip pressure from the first pressure to the second pressure. The second cam surface is contoured to change the nip pressure from the second pressure to the third pressure. An angle of action of the second cam surface is greater than an angle of action of the first cam surface. A maximum pressure angle at the second cam surface is smaller than a maximum pressure angle at the first cam surface.

A fixing device may be defined from another aspect as comprising a first fixing member including a roller, a second fixing member including a belt, a frame, an arm, a first spring, and a cam. The second fixing member is configured to form a nip in combination with the first fixing member. The frame is configured to support the first fixing member. The arm is supported by the frame and configured to support the second fixing member. The first spring is arranged to exert, on the arm, a first biasing force which produces a nip pressure at the nip between the roller and the belt. The cam is rotatably arranged to cause the arm to move against the first biasing force. The cam comprises a first cam surface configured to change the nip pressure from a first pressure to a second pressure smaller than the first pressure, and a second cam surface configured to change the nip pressure from the second pressure to a third pressure smaller than the second pressure. In this configuration as well, an angle of action of the second cam surface is greater than an angle of action of the first cam surface, and a maximum pressure angle at the second cam surface is smaller than a maximum pressure angle at the first cam surface.

With these configurations, in which the second cam surface on which is exerted a biasing force greater than that exerted on the first cam surface has an angle of action greater than that of the first cam surface and a maximum pressure angle smaller than that provided at the first cam surface, undesirable advance of the cam surface by the biasing force of the spring can be restrained.

BRIEF DESCRIPTION OF THE DRAWINGS

The above and other aspects, their advantages and further features will become more apparent by describing in detail illustrative, non-limiting embodiments thereof with reference to the accompanying drawings, in which.

DESCRIPTION OF EMBODIMENTS

Figure 1:
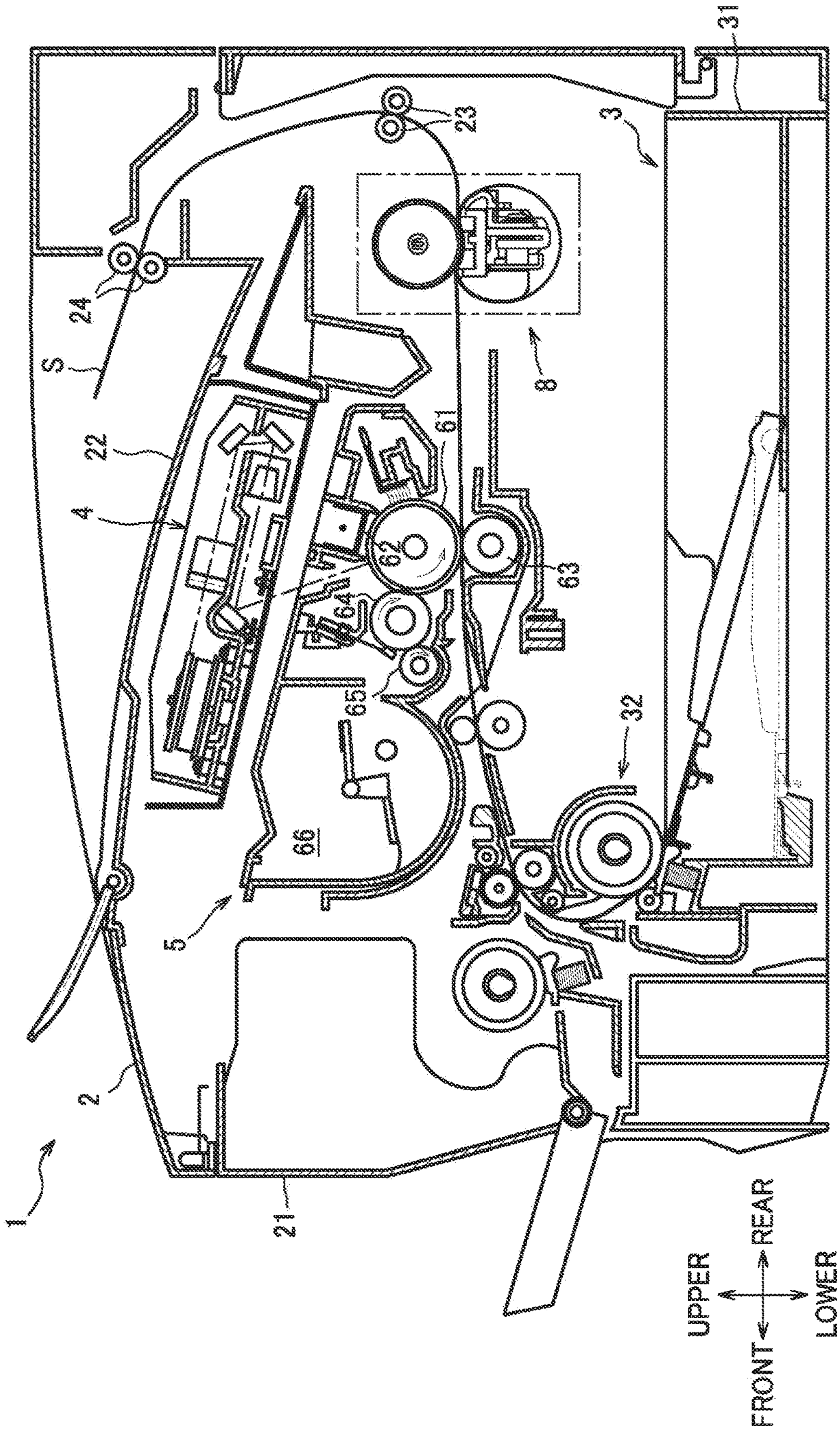
FIG. 1 is a section view of an image forming apparatus.

As shown in FIG. 1, a fixing device 8 illustrated herein is a device used in an image forming apparatus 1 such as a laser printer. The image forming apparatus 1 comprises a housing 2, a sheet feeder unit 3, an exposure device 4, a developer image forming unit 5, and the fixing unit 8.

The sheet feeder unit 3 is provided in a lower space inside the housing 2, and comprises a sheet tray 31 as a receptacle for holding and serving sheets S (e.g., of paper), and a sheet feed mechanism 32. Sheets S in the sheet tray 31 are fed on a one-by-one basis by the sheet feed mechanism 32 to the developer image forming unit 5.

The exposure device 4 is provided in an upper space inside the housing 2, and comprises a light source device (not shown), and a polygon mirror, lenses and reflectors (shown without reference characters). The exposure device 4 is configured to rapidly scan a surface of a photoconductor drum 61 with a light beam (see alternate long and short dashed lines) emitted from the light source device in accordance with image data, to thereby expose the surface of the photoconductor drum 61 to the light beam.

The developer image forming unit 5 is provided under the exposure device 4. The developer image forming unit 5 is configured as a process cartridge, installable into and removable from the housing 2 through an opening which is made available when a front cover 21 attached at a front side of the housing 2 is opened. The developer image forming unit 5 comprises a photoconductor drum 61, a charger 62, a transfer roller 63, a development roller 64, a supply roller 65, and a developer container 66 in which developer composed of dry toner is held.

In the developer image forming unit 5, the surface of the photoconductor drum 61 is uniformly charged by the charger 62. Thereafter, the surface of the photoconductor drum 61 is scanned with a light beam from the exposure device 4, and selectively exposed to light so that an electrostatic latent image formulated in accordance with the image data is formed on the surface of the photoconductor drum 61. Developer in the developer container 66 is supplied via the supply roller 65 to the development roller 64.

In the developer image forming unit 5, developer on the development roller 64 is supplied to the electrostatic latent image formed on the surface of the photoconductor drum 61. Accordingly, the electrostatic latent image is visualized, and a developer image is formed on the surface of the photoconductor drum 61. Thereafter, a sheet S fed from the sheet feeder unit 3 is conveyed through between the photoconductor drum 61 and the transfer roller 63, so that the developer image on the surface of the photoconductor drum 61 is transferred to the sheet S. In this way, the developer image is formed on the sheet S.

The fixing device 8 is provided rearward of the developer image forming unit 5. The features of the fixing device 8 will be described later in detail. The fixing device 8 causes a sheet S with a developer image transferred (formed) thereon to pass therethrough, and thereby thermally fixes the developer image on the sheet S. The image forming apparatus 1 further comprises an output tray 22, conveyor rollers 23 and ejection rollers 24. The output tray 22 is provided outside of the housing 2. The sheet S with the developer image thermally fixed thereon is ejected by the conveyor rollers 23 and the ejection rollers 24 onto the output tray 22.

Figure 2:
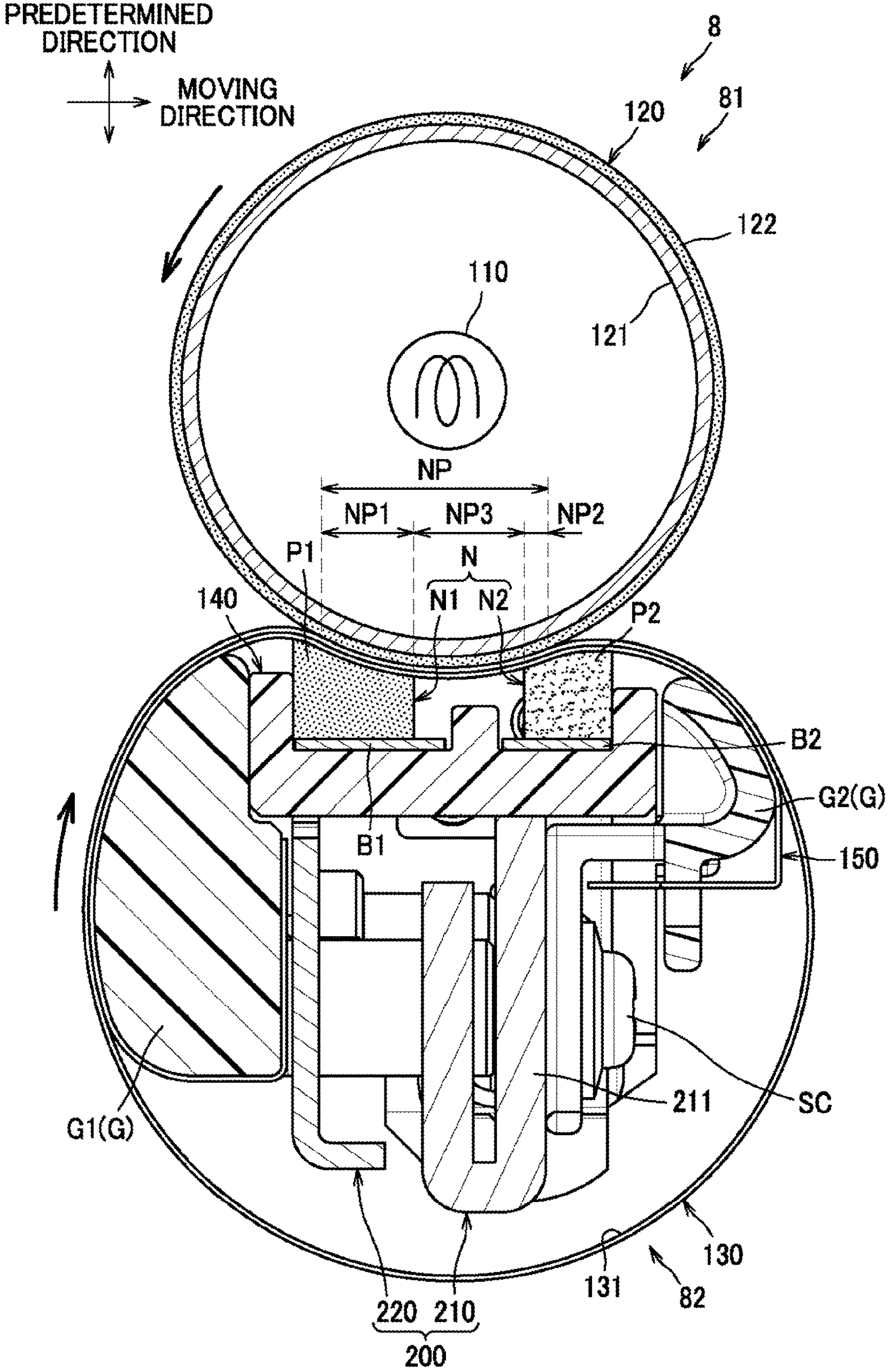
FIG. 2 is a section view of a fixing device.

As shown in FIG. 2, the fixing device 8 comprises a heater 110, a first fixing member 81, a second fixing member 82, and a pressure control mechanism 300 (see FIG. 4) of which a detailed description will be given later. The second fixing member 82 is biased toward the first fixing member 81 by the pressure control mechanism 300. In the following description, the direction in which the second fixing member 82 is biased toward the first fixing member 81 is referred to as "predetermined direction". The predetermined direction herein is, but not limited to, a direction perpendicular to a width direction and to a moving direction. The "width direction" and "moving direction" will be described below. In other words, the predetermined direction is an orientation aligned parallel to directions in which the first fixing member and the second fixing member face each other.

The first fixing member 81 includes a roller 120 that is rotatable. The second fixing member 82 includes a belt 130, a nip-forming member N, a holder 140, a stay 200, a belt guide G, and a slide sheet 150. The second fixing member 82 is a member configured to form a nip (nip region NP) in combination with the first fixing member 81. The nip region NP is formed between first fixing member 81 and the second fixing member 82. To be more specific, the nip region NP is formed between the roller 120 and the second fixing member 82. The holder 140 and the stay 200 serve as an example of a support member. In this description, the direction of the width of the belt 130 is simply referred to as "width direction". The width direction coincides with a direction of extension of an axis of rotation of the roller 120, that is, an axial direction of the roller 120. The width direction is perpendicular to the predetermined direction.

The heater 110 comprises a halogen lamp which, when energized, generates light and heat. The heater 110 applies its radiant heat to the roller 120 to cause the roller 120 to heat up. The heater 110 is disposed inside the roller 120 along the axis of rotation of the roller 120.

The roller 120 has a shape of a long tube with its length (axis of rotation) oriented parallel to the width direction, and is heated by the heater 110. The roller 120 comprises a tube blank 121 made of metal or the like, and an elastic layer 122 with which the tube blank 121 is covered. The elastic layer 122 is made of rubber, such as silicone rubber. The roller 120 is rotatably supported by side frames 83 (see FIG. 4) which will be described later. Driving force received from a motor (not shown) provided in the housing 2 causes the roller 120 to rotate in a counterclockwise direction of FIG. 2.

The belt 130 is a member having a shape of a long tube (i.e., endless belt), that is, a tubular member with flexibility. The belt 130, though not illustrated, comprises a base made of metal, plastic or the like, and a release layer with which an outside surface of the base is covered. The belt 130 is caused to rotate by friction with the roller 120 or the sheet S in the clockwise direction of FIG. 2 according as the roller 120 rotates. A lubricant, such as grease, is put on an inside surface 131 of the belt 130. Inside of the belt 130, the nip-forming member N, the holder 140, the stay 200, the belt guide G, and the slide sheet 150 are disposed.

In other words, the nip-forming member N, the holder 140, the stay 200, the belt guide G, and the slide sheet 150 as a whole are surrounded and covered with the belt 130.

Figure 3:
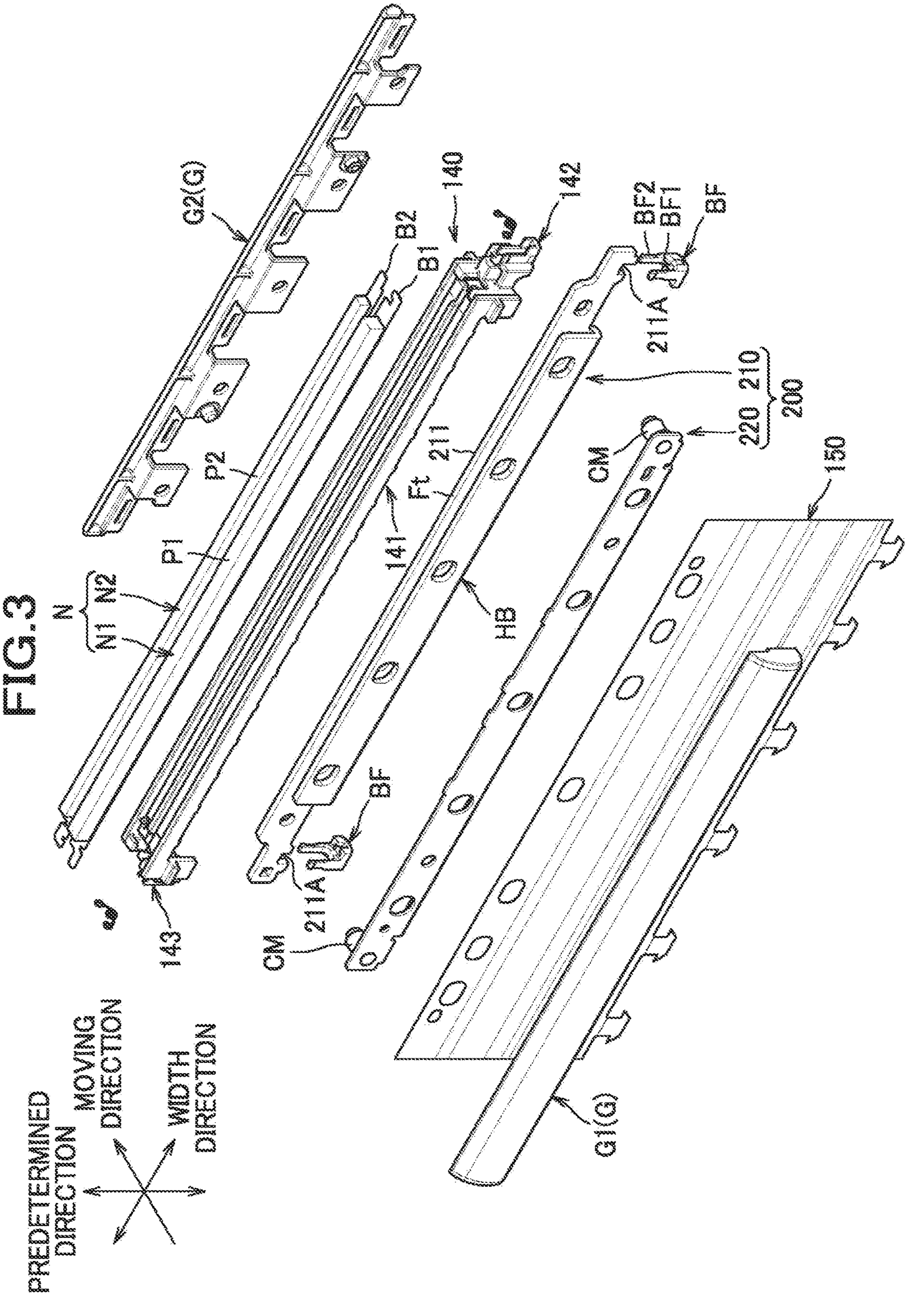
FIG. 3 is an exploded perspective view showing members arranged inside a belt.

As shown in FIG. 2 and FIG. 3, the nip-forming member N is a member configured to form a nip region NP in combination with the roller 120 by holding the belt 130 between the roller 120 and the nip-forming member N. The nip-forming member N comprises an upstream nip-forming member N1 and a downstream nip-forming member N2.

The upstream nip-forming member N1 comprises an upstream pad P1 and an upstream fastening plate B1. The upstream pad P1 is a rectangular parallelepiped member. The upstream pad P1 is made of rubber, such as silicone rubber. The upstream pad P1 and the roller 120 hold the belt 130 therebetween to form an upstream nip region NP1.

In this description, the direction of motion of the belt 130 at the upstream nip region NP1, or the nip region NP of which a detailed description will be given later, is simply referred to as "moving direction". The moving direction should in actuality vary gradually with the curved contour of the periphery (outer cylindrical surface) of the roller 120, but is herein illustrated as a direction perpendicular to the predetermined direction and to the width direction, because this direction is substantially the same direction as the direction perpendicular to the predetermined direction and to the width direction. It is to be understood that the moving direction is the same direction as a direction of conveyance of a sheet S at the nip region NP.

The upstream pad P1 is fixed to (particularly, on a roller 120 side surface of) the upstream fastening plate B1. The upstream fastening plate B1 is made of a material harder than that of the upstream pad P1. For example, the upstream fastening plate B1 may be made of metal.

The downstream nip-forming member N2 is located downstream in the moving direction of and apart from the upstream nip-forming member N1. The downstream nip-forming member N2 comprises a downstream pad P2 and a downstream fastening plate B2. The downstream pad P2 is a rectangular parallelepiped member. The downstream pad P2 is made of rubber, such as silicone rubber. The downstream pad P2 and the roller 120 hold the belt 130 therebetween to form a downstream nip region NP2. The downstream pad P2 is located apart from the upstream pad P2 in a direction of rotation (or the moving direction) of the belt 130.

Accordingly, between the upstream nip region NP1 and the downstream nip region NP2, there exists an intervening nip region NP3 on which no pressure is directly exerted from the second fixing member 82. In this intervening nip region NP3, the belt 130 is in contact with the roller 120, but almost no pressure is applied because there is no counterpart member which holds the belt 130 in combination with the roller 120. Therefore, when a sheet S conveyed through between the roller 120 and the belt 130 passes through the intervening nip region NP3, the sheet S is subjected to heat from the roller 120 but not subjected to pressure. In this description, the whole region from an upstream end of the upstream nip region NP1 to a downstream end of the downstream nip region NP2, i.e., the whole region in which the outside surface of the belt 130 and the roller 120 contact each other is referred to as "nip region NP". In other words, in this example, the nip region NP covers a region on which pressing forces from the upstream pad P1 and the downstream pad P2 are not exerted.

The downstream pad P2 is fixed to (particularly, on a roller 120 side surface of) the downstream fastening plate B2. The downstream fastening plate B2 is made of a material harder than that of the downstream pad P2. For example, the downstream fastening plate B2 may be made of metal.

The upstream pad P1 has a hardness greater than a hardness of the elastic layer 122 of the roller 120. The downstream pad P2 has a hardness greater than a hardness of the upstream pad P1.

The hardness herein refers to durometer hardness as specified in ISO 7619-1. The durometer hardness is a value determined from the depth of an indentation in a test piece created by the standardized indenter under specified conditions. For example, where the elastic layer 122 has a durometer hardness of 5, it is preferable that the upstream pad P1 have a durometer hardness in a range of 6 to 10, and the downstream pad P2 have a durometer hardness in a range of 70 to 90.

The holder 140 is a member that holds the nip-forming member N. The holder 140 is made of plastic or other material having a heat-resisting property. The holder 140 comprises a holder base 141 and two engagement portions 142, 143.

The holder base 141 is a portion that holds the nip-forming member N. The holder base 141 is mostly located within a space covered by the belt 130 so as not to protrude outward from the inside of the belt 130 in the width direction. The holder base 141 includes two end portions positioned near the open sides of the belt 130 (tubular endless belt) which open outward in the width direction. The holder base 141 is supported by the stay 200.

The engagement portions 142, 143 are provided at the end portions of the holder base 141. Each of the engagement portions 142, 143 extends from the corresponding end portion of the holder base 141 outward in the width direction. The engagement portions 142, 143 are located outside the space covered by the belt 130 (at the outsides of the open sides of the belt 130 which open outward in the width direction). The engagement portions 142, 143 are engaged with respective end portions of a first stay 210 which will be described below. Specifically, the end portions of the first stay 210 with which the engagement portions 142, 143 are engaged are positioned near the open sides, which open outward in the width direction, of the tubular endless belt 130.

The stay 200 is a member located across the holder 140 from the nip-forming member N to support the holder 140. In other words, the stay 200 and the nip-forming member N are on opposite sides of the holder 140. The stay 200 comprises a first stay 210, and a second stay 220 connected to the first stay 210 by means of a connecting member CM.

The first stay 210 is a member that supports the holder base 141 of the holder 140. The first stay 210 is made of metal or the like. The first stay 210 comprises a base portion 211, and a hemmed portion HB formed by bending the material back on itself.

The base portion 211 has, at one side thereof facing to the holder 140, a contact surface Ft that contacts the holder base 141 of the holder 140. The contact surface Ft is a flat surface perpendicular to the predetermined direction.

The base portion 211 having its length oriented parallel to the width direction comprises, at its both end portions, load-receiving portions 211A that receive forces from the pressure control mechanism 300 (see FIG. 4) which will be described later. The load-receiving portion 211A provided at each end portion of the base portion 211 is configured to have a recess that opens on a side facing away from the nip-forming member N in a direction parallel to the predetermined direction. In other words, each end portion of the base portion 211 has a side facing away from the nip-forming number N in the direction parallel to the predetermined direction, and the load-receiving portion 211A is formed at that side of each end portion of the base portion 211.

A buffer member BF made of plastic or the like is attached to the load-receiving portion 211A. The buffer member BF is a member which protects the base portion 211 made of metal and an arm 310 (see FIG. 4) which will be described later from rubbing against each other. The buffer member BF comprises a fit-on portion BF1 and a pair of leg portions BF2. The fit-on portion BF1 is configured to fit on the load-receiving portion 211A. The leg portions BF2 are located at upstream and downstream sides in the moving direction, respectively, of each of the aforementioned end portions of the base portion 211.

The belt guide G is a member that contacts the inside surface 131 to guide the belt 130. The belt guide G is made of plastic or other material having a heat-resisting property. The belt guide G comprises an upstream guide G1 and a downstream guide G2.

The slide sheet 150 is a rectangular sheet configured to reduce the frictional resistance between each pad P1, P2 and the belt 130. The slide sheet 150 is held at the nip region NP between the inside surface 131 of the belt 130 and each pad P1, P2. The slide sheet 150 is made of an elastically deformable material. It is to be understood that any material can be used for the slide sheet 150; herein, a sheet of plastic containing polyimide resin is adopted.

As shown in FIG. 2, the upstream guide G1, the downstream guide G2, and the first stay 210 are fastened together using a screw SC.

Figure 4:
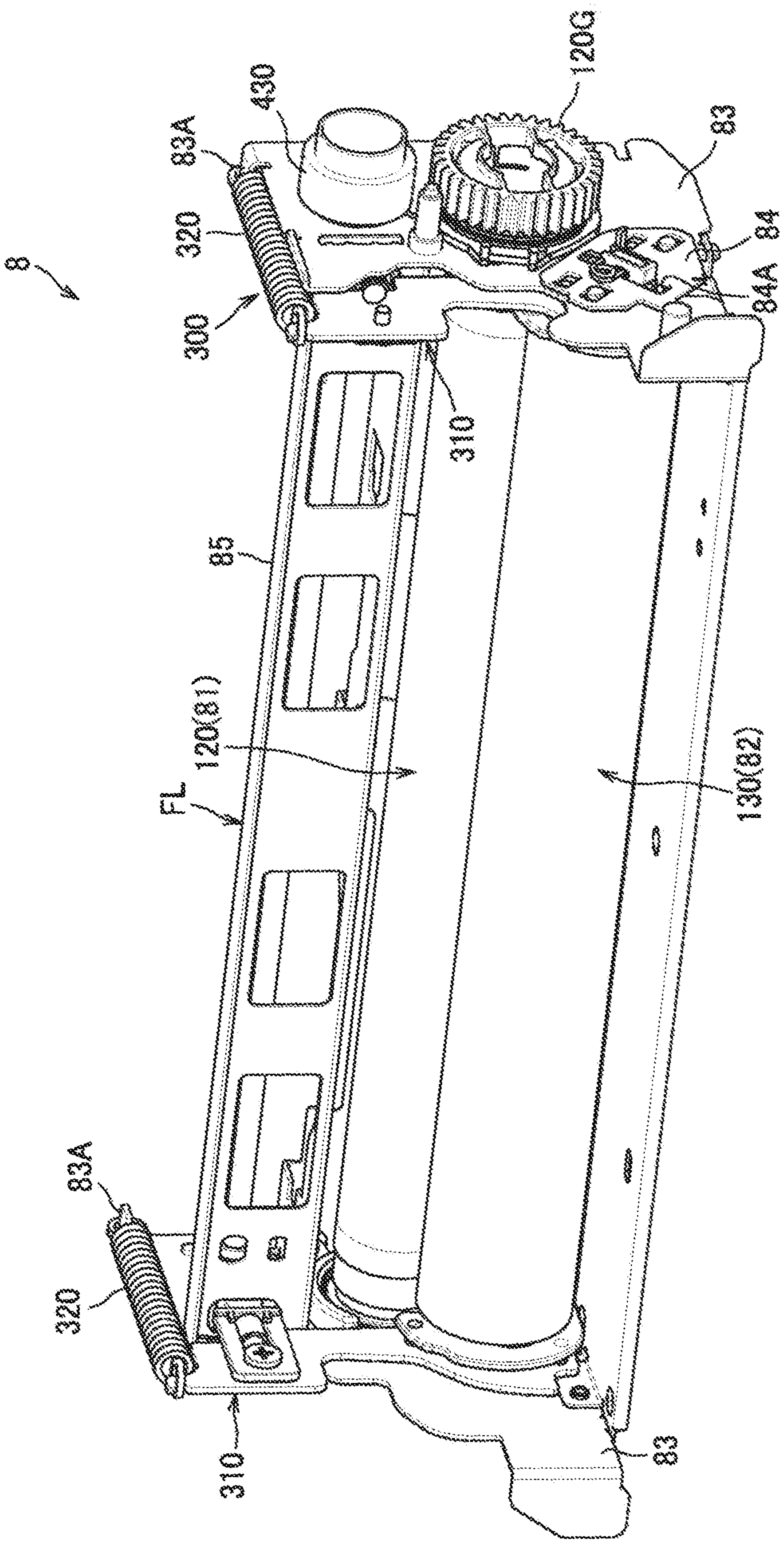
FIG. 4 is a perspective view of a pressure control mechanism.

As shown in FIG. 4, the fixing device 8 further comprises a frame FL and a pressure control mechanism 300. The frame FL is a frame that supports the first fixing member 81 and the second fixing member 82. The frame FL is made of metal, or the like. The frame FL comprises side frames 83, brackets 84, and a connecting frame 85. The side frames 83 and the brackets 84 are provided at both sides of the first fixing member 81 and the second fixing member 82 facing outward in the width direction. The connecting frame 85 is connected to the side frames 83.

The side frames 83 are frames that support the first fixing member 81 and the second fixing member 82. Each of the side frames 83 comprises a spring engageable portion 83A configured to be engageable with one end portion of a first spring 320 which will be described later.

The bracket 84 is a member that supports the second fixing member 82 in a manner that permits the second fixing member 82 to move along the predetermined direction. The bracket 84 is fixed to the side frame 83. To be more specific, the bracket 84 has a first slot 84A elongate in the predetermined direction. The first slot 84A supports the engagement portions 142, 143 of the holder 140 whereby the end portions of the first stay 210 with which the engagement portions 142, 143 are engaged are supported movably along the predetermined direction by the first slot 84A.

Figure 5A:
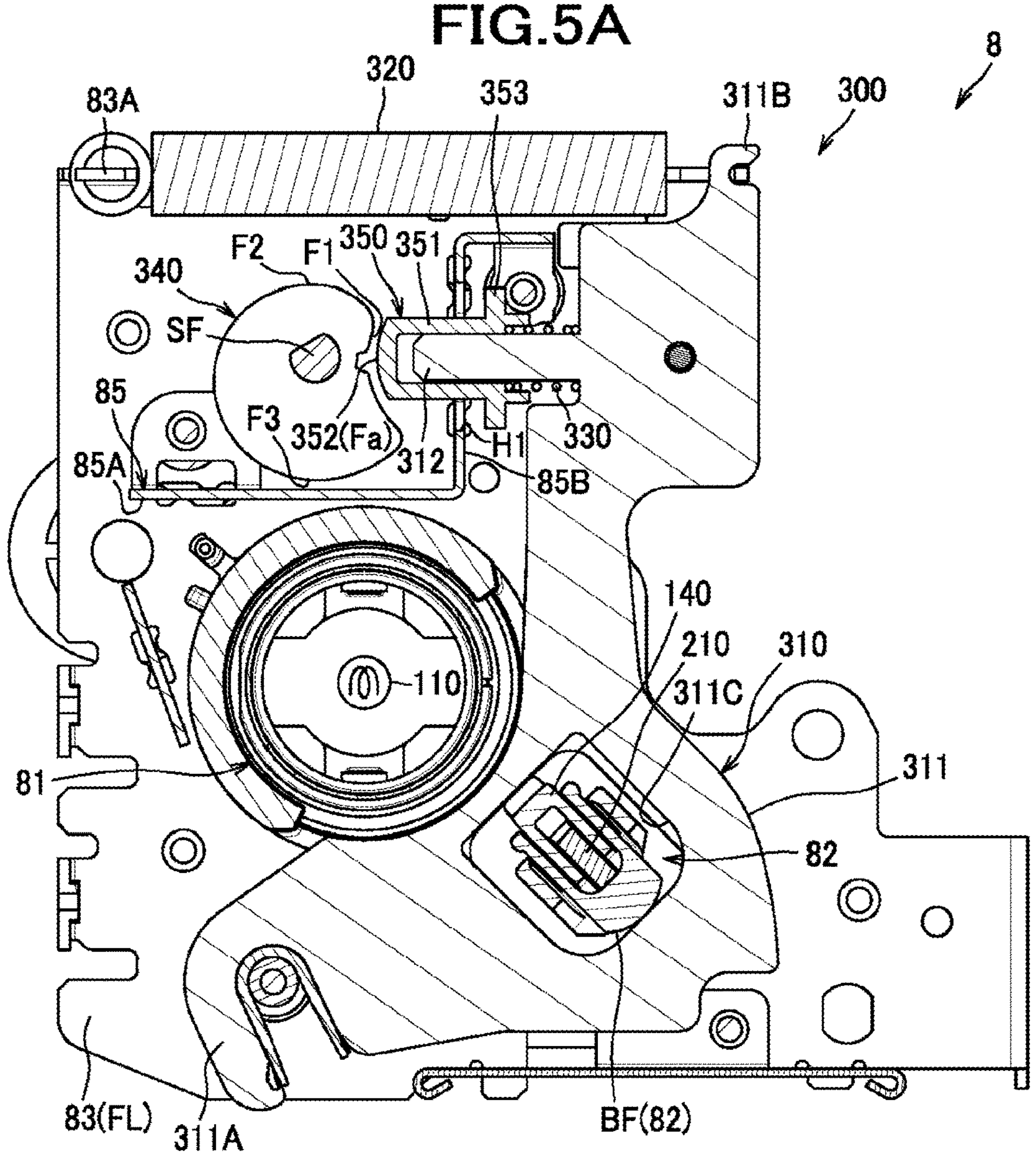
FIG. 5A is a section view of the pressure control mechanism in which a nip pressure is adjusted to a first pressure.
Figure 5B:
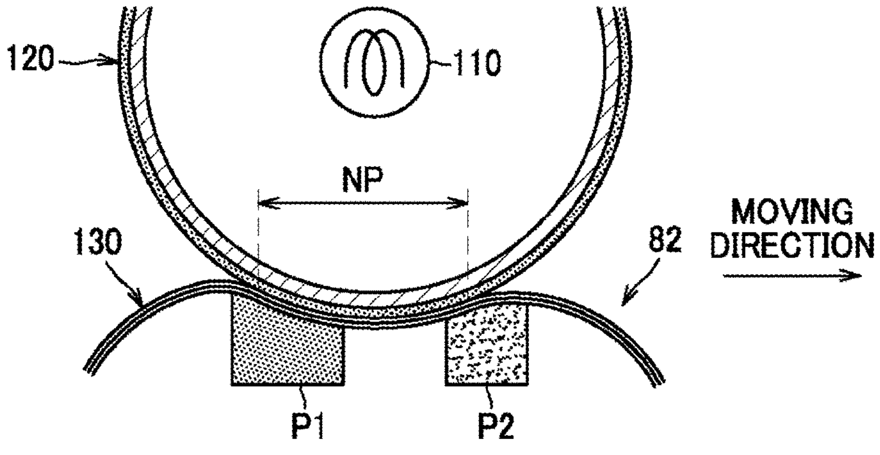
FIG. 5B is a section view showing a nip region, with its surrounding structural features, formed when the nip pressure takes on the first pressure.

The pressure control mechanism 300 is a mechanism configured to change a nip pressure exerted at the nip region NP. To be more specific, the pressure control mechanism 300 is configured to be capable of adjusting the nip pressure at the nip region NP to one of a first pressure, a second pressure smaller than the first pressure, and a third pressure smaller than the second pressure. As shown in FIG. 4 and FIG. 5A, the pressure control mechanism 300 comprises an arm 310, a first spring 320, a second spring 330, a cam 340, and a shaft SF. The arm 310, the first spring 320, the second spring 330, and the cam 340 are provided at each of the ends of the frame FL facing outward in the width direction.

The shaft SF is a shaft made of metal extending long in the width direction. The shaft SF has its axis of rotation oriented in the width direction, and its both ends facing outward in the width direction. The cam 340 is provided one on each of these ends of the shaft SF. The shaft SF is configured to be rotatable together with the cams 340 at its both ends.

The arm 310 is a member configured to push the first stay 210 with the buffer member BF interposed between the arm 310 and the first stay 210. In actuality, the arm 310 pushes the buffer member BF which in turn pushes the first stay 210. Two arms 310 are configured to support the second fixing member 82, and are rotatably supported by the side frames 83.

The arm 310 comprises an arm body 311 and a cam follower 350. The arm body 311 is an L-shaped plate member made of metal or the like.

The arm body 311 comprises a first end portion 311A rotatably supported by the side frame 83, a second end portion 311B to which the first spring 320 is connected, and an engageable hole 311C in which the second fixing member 82 is supported. The engageable hole 311C is located between the first end portion 311A and the second end portion 311B, and is engaged with the buffer member BF.

The arm body 311 further comprises a guide protrusion 312 extending long toward the cam 340. The guide protrusion 312 is located closer to the second end portion 311B than to the first end portion 311A. More specifically, the guide protrusion 312 is located closer, than the engageable hole 311C, to the second end portion 311B. That is, the guide protrusion 312 is located between a first plane intersecting the second end portion 311B and a second plane intersecting the engageable hole 311C which planes are perpendicular to a straight line passing through the second end portion 311B and the engageable hole 311C.

The cam follower 350 is fitted on the guide protrusion 312 of the arm body 311 in a manner that permits the cam follower 350 to move relative to the guide protrusion 312. The cam follower 350 is contactable with the cam 340. The cam follower 350 is made of plastic or the like, and comprises a tubular portion 351, a contact portion 352, and a flange portion 353. The tubular portion 351 is a portion fitted on the guide protrusion 312. The contact portion 352 is provided at one end of the tubular portion 351. The flange portion 353 is provided at the other end of the tubular portion 351.

The tubular portion 351 is supported, by the guide protrusion 312, movably along a line parallel to the protruding direction of the guide protrusion 312. The contact portion 352 is a wall closing a cam 340 side open end of the tubular portion 351, and is located between the cam 340 and the extreme end of the guide protrusion 312. The contact portion 352 has a contact surface Fa contactable with the cam 340. The contact surface Fa is an outwardly-curving surface bulging toward the cam 340. The flange portion 353 protrudes from the other end of the tubular portion 351 in radial directions perpendicular to a direction of movement of the cam follower 350.

A second spring 330 is disposed between the tubular portion 351 and the arm body 311. Accordingly, the arm body 311 is configured not only to be biased by the first spring 320 but also to be able to be biased by the second spring 330.

The first spring 320 is a spring exerting a first biasing force (tensile force) on the second fixing member 82. Specifically, the first spring 320 exerts the first biasing force on the arm body 311 which in turn exerts the same first biasing force on the second fixing member 82; i.e., the first biasing force exerted on the arm body 311 acts via the arm body 311 on the second fixing member 82.

To be more specific, the biasing force of the first spring 320 is transmitted via the arm body 311, the buffer member BF, the first stay 210, and the holder 140, to thereby cause the upstream pad P1 and the downstream pad P2 to be biased toward the roller 120. The first spring 320 is a helical tension spring made of metal or the like, and has its one end connected to the spring engageable portion 83A of the side frame 83, and its other end connected to the second end portion 311B of the arm body 311. In this way, the arm 310 biased by the first spring 320 serves to provide the nip pressure at the nip region NP between the roller 120 and the belt 130.

The second spring 330 is a spring capable of exerting, on the second fixing member 82, a second biasing force (compression-resisting force) in a direction opposite to a direction of the first biasing force. Specifically, the second spring 330 is configured to be capable of exerting the second biasing force on the arm body 311 which in turn exerts the same second biasing force on the second fixing member 82; i.e., the second biasing force exerted on the arm body 311 acts via the arm body 311 on the second fixing member 82. The second spring 330 is a helical compression spring made of metal or the like, and is disposed between the tubular portion 351 and the arm body 311 with the guide protrusion 312 inserted in a space surrounded by the helical compression spring.

The cam 340 is a member capable of changing the compression state of the second spring 330 to a first compression state in which the second biasing force is not exerted on the second fixing member 82, to a second compression state in which the second biasing force is exerted on the second fixing member 82, and to a third compression state in which the second spring 330 is deformed more than in the second compression state. Moreover, the cam 340 also has a function of causing the second fixing member 82 to move against the biasing force of the first spring 320. The cam 340 is supported by the side frame 83 in a manner that allows the cam 340 to rotate to a first cam position shown in FIG. 5A, to a second cam position shown in FIG. 6A, and to a third cam position shown in FIG. 7A. As will be described below in detail, the cam 340 is configured such that the nip pressure varies according to the cam position, and takes on the first pressure in the first cam position, the second pressure in the second cam position, and the third pressure in the third cam position. To be more specific, the cam 340 is caused to rotate in a clockwise direction as in the drawings from the first cam position to the third cam position by a motor (not shown) running in a forward direction, and to rotate in a counterclockwise direction as in the drawings from the third cam position to the first cam position by the motor running in a reverse direction.

The cam 340 is made of plastic or the like, and comprises an opposite surface F1, a first support surface F2, and a second support surface F3. The opposite surface F1, the first support surface F2, and the second support surface F3 are located on an outer surface (periphery) of the cam 340.

The opposite surface F1 is a surface that faces the contact surface Fa of the cam follower 350 when the cam 340 is in the first cam position, i.e., where the nip pressure is the first pressure. The opposite surface F1 is a curved surface contoured to fit the outwardly-curving contact surface Fa. When the cam 340 is in the first cam position, the opposite surface F1 is located apart from the cam follower 350.

Figure 6A:
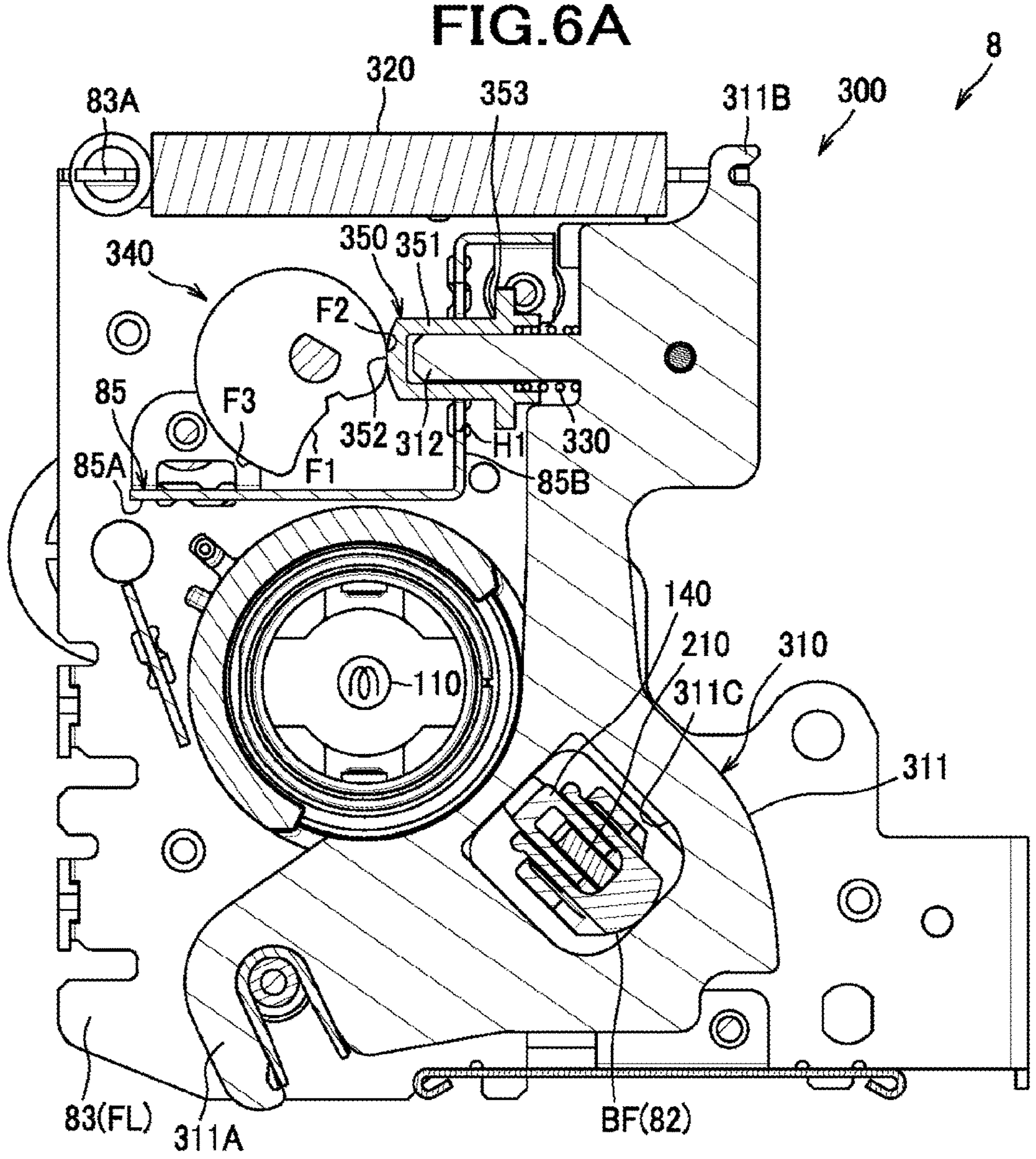
FIG. 6A is a section view of the pressure control mechanism in which the nip pressure is adjusted to a second pressure.

As shown in FIG. 6A, the first support surface F2 is a surface that supports the cam follower 350 in such a manner that the second spring 330 is kept in the second compression state. The first support surface F2 contacts the cam follower 350 when the cam 340 is in the second cam position, i.e., where the nip pressure is the second pressure. To be more specific, the first support surface F2 comes in contact with the cam follower 350 when the cam 340 is caused to rotate from the first cam position approximately 90 degrees in the clockwise direction as in the drawing. The distance from the first support surface F2 to the center of rotation of the cam 340 is greater than the distances from the opposite surface F1 to the center of rotation of the cam 340.

Figure 7A:
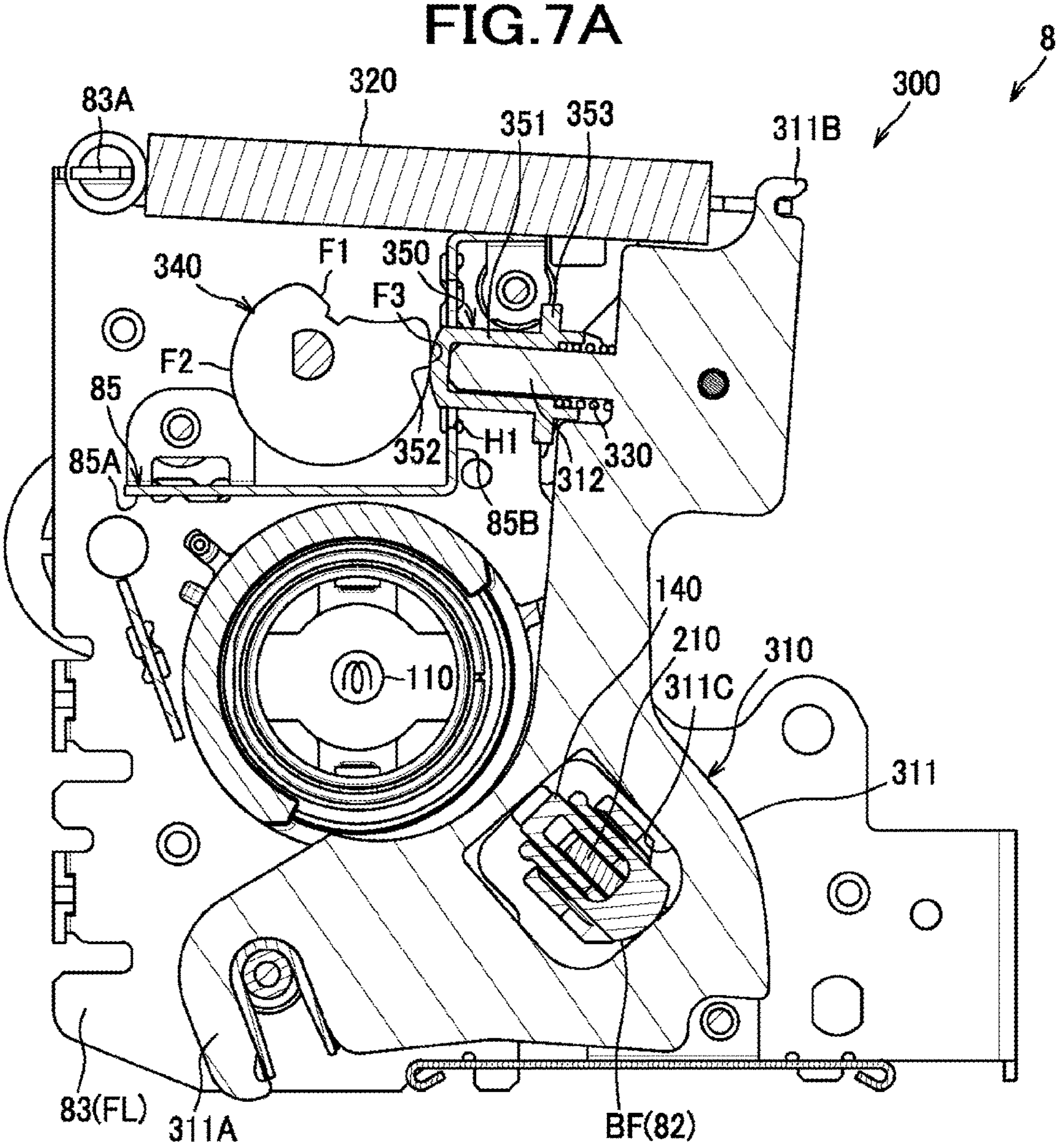
FIG. 7A is a section view of the pressure control mechanism in which the nip pressure is adjusted to a third pressure.

As shown in FIG. 7A, the second support surface F3 is a surface that supports the cam follower 350 in such a manner that the second spring 330 is kept in the third compression state and the position of the arm body 311 is kept in a second position different from a first position shown in FIG. 5A and FIG. 6A. The second support surface F3 contacts the cam follower 350 when the cam 340 is in the third cam position, i.e., where the nip pressure is the third pressure. To be more specific, the second support surface F3 comes in contact with cam follower 350 when the cam 340 is caused to rotate from the first cam position approximately 270 degrees in the clockwise direction as in the drawing, in other words, when caused to rotate from the second cam position approximately 180 degrees in the clockwise direction as in the drawing. The distance from the second support surface F3 to the center of rotation of the cam 340 is greater than the distance from the first support surface F2 to the center of rotation of the cam 340.

When the cam 340 is in the first cam position, the cam 340 is positioned apart from the cam follower 350, and thus the second spring 330 is in the first compression state. In this state, where the cam 340 leaves the second spring 330 in the first compression state, the arm body 311 assumes the first position shown in FIG. 5A.

To be more specific, when the cam 340 leaves the second spring 330 in the first compression state, the second biasing force of the second spring 330 is not exerted via the arm body 311 on the second fixing member 82 because the cam 340 is positioned apart from the cam follower 350, so that only the first biasing force of the first spring 320 is exerted via the arm body 311 on the second fixing member 82. In this state where the first biasing force is exerted on the second fixing member 82 by the first spring 320 and the second biasing force is not exerted on the second fixing member 82 by the second spring 330, the nip pressure takes on the first pressure.

In this non-limiting example of the fixing device 8 illustrated herein, when the cam 340 leaves the second spring 330 in the first compression state, the second spring 330 is held in a deformed state between the cam follower 350 and the arm body 311. That is, the second spring 330 in the first compression state is not let be in its equilibrium length but deformed from its equilibrium length. It is understood that the second spring 330 even in such a deformed state does not exert its second biasing force on the second fixing member 82 because the cam 340 is apart from the cam follower 350.

The cam 340 comes in contact with the cam follower 350 and causes the cam follower 350 to move for a predetermined distance relative to the arm body 311 during the process of rotation from the first cam position shown in FIG. 5A to the second cam position shown in FIG. 6A, i.e., where the nip pressure is changed from the first pressure to the second pressure. Accordingly, the second spring 330 between the cam follower 350 and the arm body 311 deforms, and when the cam 340 has got positioned in the second cam position, the compression state of the second spring 33 changes to the second compression state in which the second spring 330 is deformed (compressed) more than in the first compression state.

When the cam 340 is positioned in the second cam position, the cam follower 350 is supported by the cam 340, so that the second biasing force of the second spring 330 is exerted via the arm body 311 on the second fixing member 82 in a direction reverse to the direction of the first biasing force. Therefore, where the first biasing force is exerted on the second fixing member 82 by the first spring 320 and the second biasing force is exerted on the second fixing member 82 by the second spring 330, the nip pressure takes on the second pressure smaller than the first pressure.

When the cam 340 causes the second spring 330 to assume the second compression state, the arm body 311 remains in the first position described above. It is to be understood that the downstream pad P2 is substantially not deformed when pressed against the roller 120, i.e., put under a load irrespective of its magnitude. As the downstream pad P2 is substantially not deformed, the positions of the stay 200 supporting the downstream pad P2, and the arm 310 supporting the stay 200 as well, remain substantially unchanged irrespective of the magnitude of the load. Moreover, the position of the upstream pad P1 depends on the position of the downstream pad P2, and thus remains unchanged, if the downstream pad P2 is substantially not deformed with its position unchanged accordingly. Therefore, the strong nip condition (under the first pressure) and the weak nip condition (under the second pressure) are not different from each other in terms of the entire nip width (distance from an entrance or upstream edge of the upstream nip region NP1 to an exit or downstream edge of the downstream nip region NP2), and the position of the arm 310 remains substantially unchanged between these nip conditions.

The reason that the downstream pad P2 is not deformed is that the hardness of the downstream pad P2 is sufficiently greater than the hardness of the upstream pad P1 and the hardness of the elastic layer 122 of the roller 120. To be more specific, the reason lies in that the downstream pad P2 is hard enough to resist nonnegligible deformation which would otherwise be caused by a required range of nip pressures from the maximum nip pressure (downstream nip pressure under the strong nip condition) to the minimum nip pressure (downstream nip pressure under the weak nip condition) to be produced at the downstream nip region NP2.

Conversely, the maximum nip pressure and the minimum nip pressure required to be produced at the downstream nip region NP2 are set at such levels that the downstream pad P2 is substantially not deformed.

Hereupon, it is to be understood that “the downstream nip P2 is substantially not deformed” connotes that the downstream nip P2 may be deformed to such a level that change in the nip width (dimension and position of the nip in the moving direction of the belt) of the downstream nip region NP2 formed by the downstream pad P2 would not affect the image quality and the sheet conveyance (i.e., the variation in the downstream nip width may not be zero).

Since the arm body 311 assumes the first position regardless of whether the second spring 330 is in the first compression state or in the second compression state as described above, both of the upstream pad P1 and the downstream pad P2 serve to hold the belt 130 so that the belt 130 is held between the upstream pad P1 and the roller 120 and between the downstream pad P2 and the roller 120, under the both nip conditions: the condition in which the nip pressure takes on the first pressure; and the condition in which the nip pressure takes on the second pressure. More specifically, the position of the second fixing member 82 relative to the roller 120 is substantially the same under the both conditions, and thus the width (dimension in the moving direction) of the nip region NP is substantially the same under the both conditions.

The cam 340 causes the cam follower 350 to further move relative to the arm body 311 to cause the cam follower 350 to contact the arm body 311 during the process of rotation from the second cam position shown in FIG. 6A to the third cam position shown in FIG. 7A, i.e., where the nip pressure is changed from the second pressure to the third pressure. Thereafter, the cam 340 further caused to rotate pushes the arm body 311 via the cam follower 350. Accordingly, the compression state of the second spring 330 changes to the third compression state in which the second spring 330 is deformed more than in the second compression state, and the arm body 311 is caused to rotate from the first position to the second position different from the first position.

To be more specific, in the first stage of the process of rotation of the cam 340 from the second cam position to the third cam position, the cam follower 350 moves relative to the arm body 311, and the contact portion 352 of the cam follower 350 approaches the extreme end of the guide protrusion 312. When the contact portion 352 comes in contact with the extreme end of the guide protrusion 312, the compression state of the second spring 330 changes to the third compression state. Accordingly, when the cam 340 causes the second spring 330 to assume the third compression state, the contact portion 352 that is part of the cam follower 350 is held between the cam 340 and the guide protrusion 312. In other words, the contact portion 352 not only contacts the cam 340 but also contacts the guide protrusion 312. Thereafter, the cam 340 further caused to rotate pushes the guide protrusion 312 via the contact portion 352, and the arm body 311 is thereby caused to rotate against the biasing force of the first spring 320 from the first position to the second position. In short, the cam 340 causes the first spring 320 to deform via the cam follower 350 and the arm body 311.

Figure 6B:
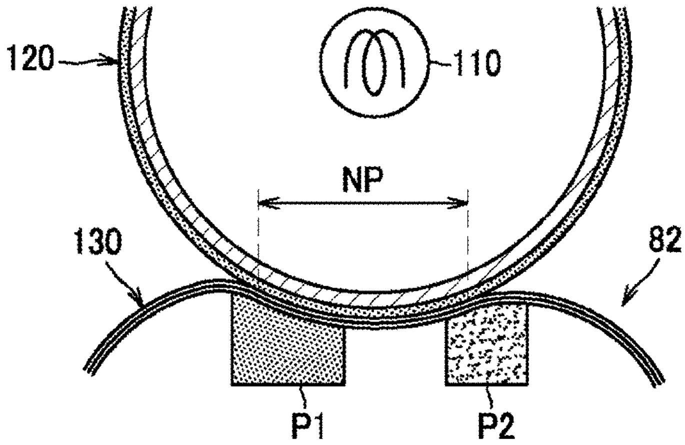
FIG. 6B is a section view showing a nip region, with its surrounding structural features, formed when the nip pressure takes on the second pressure.

In this way, when the arm body 311 is in the second position, the second fixing member 82 is located in a position (see FIG. 7B) farther apart from the roller 120 than a position (see FIG. 6B) in which the second fixing member 82 is located when the arm body 311 is in the first position.

Figure 7B:
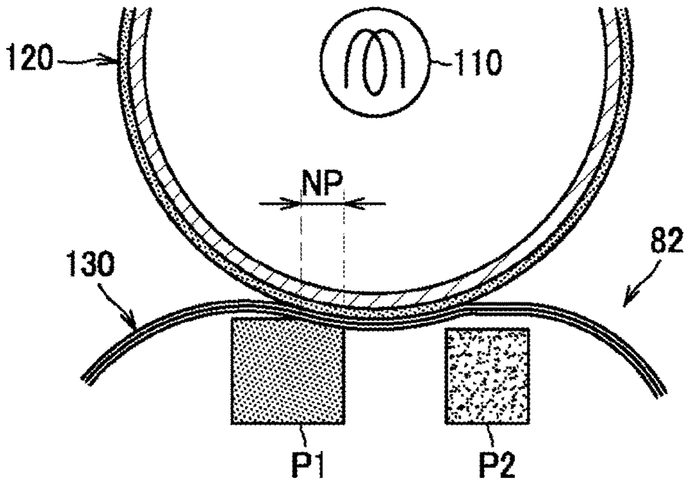
FIG. 7B is a section view showing a nip region, with its surrounding structural features, formed when the nip pressure takes on the third pressure.

Such change in the position of the second fixing member 82 relative to the roller 120 makes the width (dimension in the moving direction) of the nip region NP formed when the arm body 311 is in the second position smaller than that formed when the arm body 311 is in the first position, as shown in FIG. 7B, and the nip pressure is changed to the third pressure smaller than the second pressure. That is, the position of the arm 310 is changed by the cam 340 whereby the nip pressure and the nip width are changed. To be more specific, when the arm 310 is in the second position, the belt 130 is held only between the upstream pad P1 and the roller 120 but not held between the downstream pad P2 and the roller 120. Therefore, when the arm 310 is in the second position, the upstream nip pressure and the upstream nip width become smaller, and the downstream nip pressure becomes zero.

In the illustrated example, when the nip pressure takes on the third pressure, the upstream pad P1 serves to hold the belt 130, and the belt 130 is held between the upstream pad P1 and the roller 120; however, this configuration may not be essential for this implementation. As an alternative, the belt 130 may not be held between the upstream pad P1 and the roller 120 when the nip pressure takes on the third pressure. In this alternative example, the third nip pressure is zero.

A first wall 85A that is part of the connecting frame 85 described above is disposed between the cam 340 and the heater 110. The connecting frame 85 comprises a first wall 85A and a second wall 85B.

The second wall 85B extends from one end of the first wall 85A toward the first spring 320. The second wall 85B has a hole H1 through which the tubular portion 351 of the cam follower 350 is disposed.

Figure 8A:
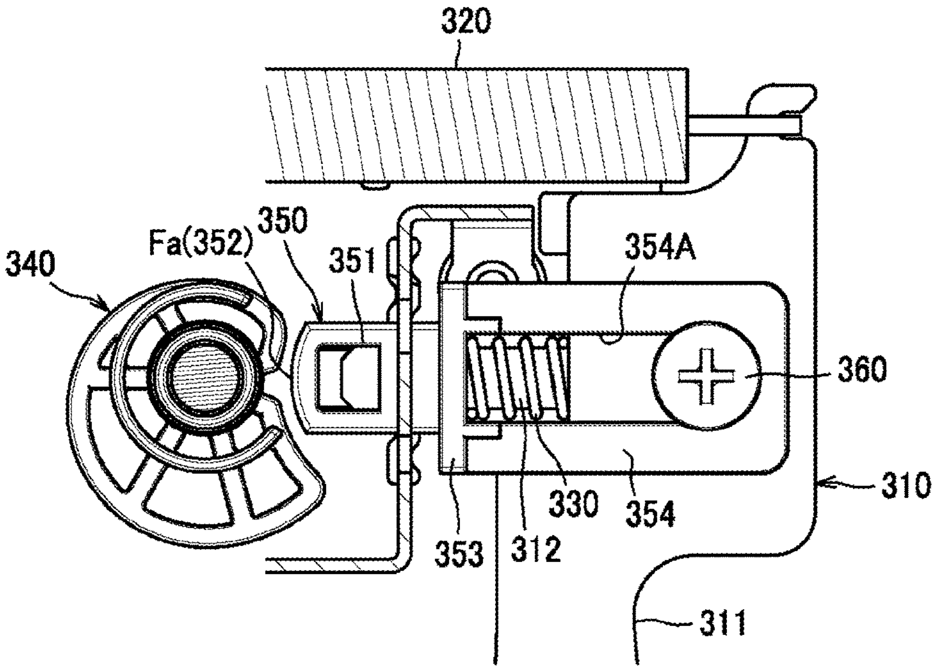
FIG. 8A is a view showing a cam follower and an associated screw.
Figure 8B:
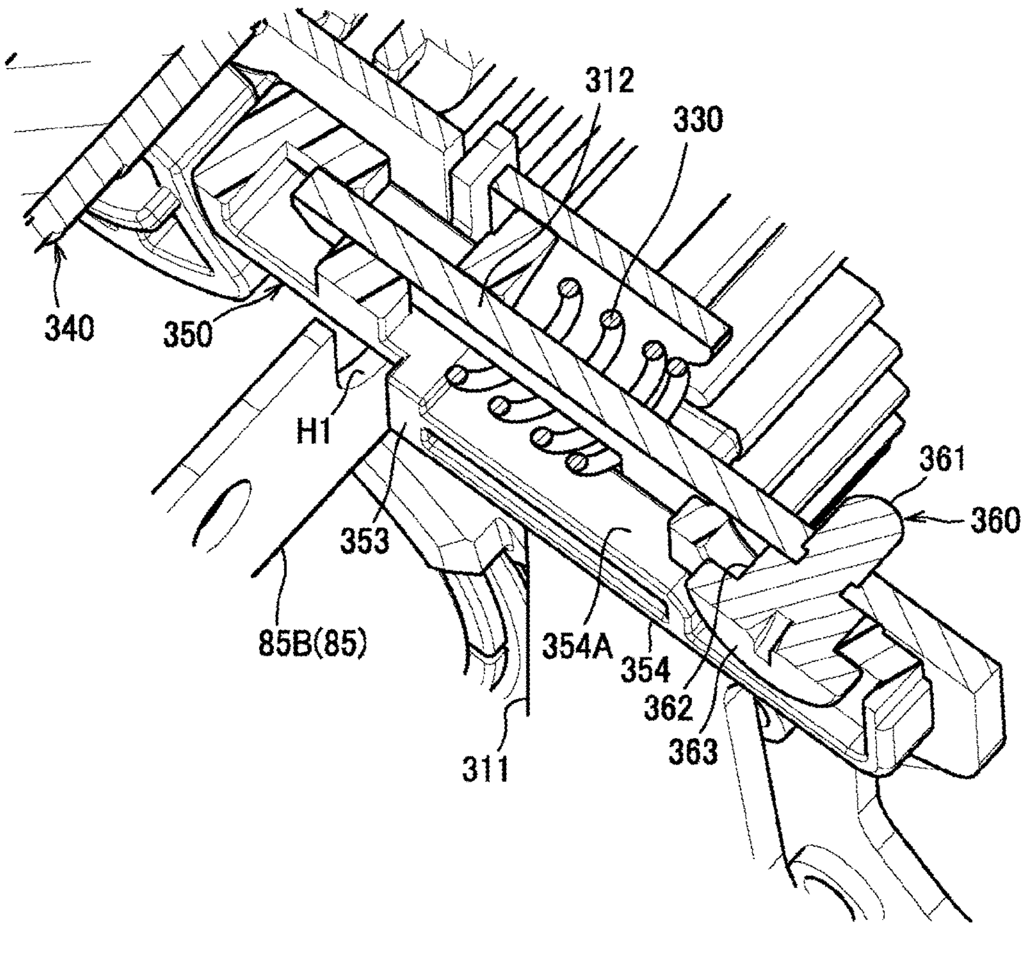
FIG. 8B is a cutaway perspective view showing the cam follower, a second spring, and an arm body.

As shown in FIG. 8, the arm 310 further comprises a screw 360 as a restriction member. The screw 360 is configured as a shoulder screw made of metal or the like to restrict motion of the cam follower 350 toward the cam 340. The screw 360 comprises a threaded shank portion 361 having a threaded external cylindrical surface, a shoulder portion 362 having a diameter larger than a diameter of the threaded shank portion 361, and a head portion 363 having a diameter larger than the diameter of the shoulder portion 362. The shoulder portion 362 is provided between the threaded shank portion 361 and the head portion 363. The screw 360 is fastened to the arm body 311 with the shoulder portion 362 abutting on one side surface of the arm body 311.

On the other hand, the cam follower 350 further comprises an extension portion 354 extending from the flange portion 353 to the screw 360. The extension portion 354 has an elongate hole 354A engageable with the shoulder portion 362 of the screw 360. The extension portion 354 is slidably in contact with the aforementioned one side surface of the arm body 311.

The elongate hole 354A extends long in the protruding direction of the guide protrusion 312. The shoulder portion 362 of the screw 360 is contactable with a screw 360 side end of the elongate hole 354 so that the cam follower 350 is restrained from moving toward the cam 340 by the screw 360.

The extension portion 354 is located between the head portion 363 of the screw 360 and the arm body 311. Therefore, the cam follower 350 is supported by the arm body 311 in a manner that permits the cam follower 350 to move without coming off the arm body 311.

Figure 9A:
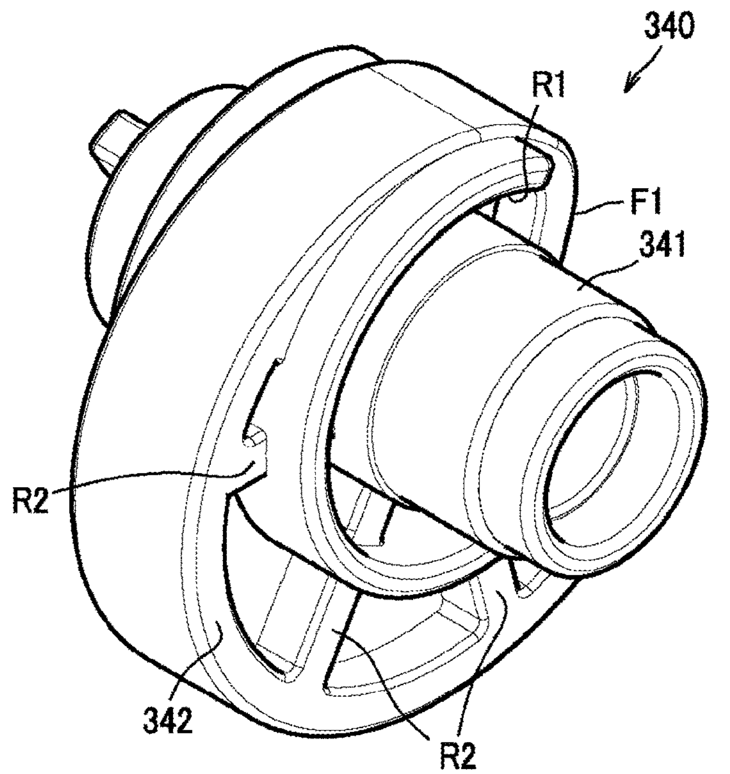
FIGS. 9A and 9B are perspective views of a cam.
Figure 9B:
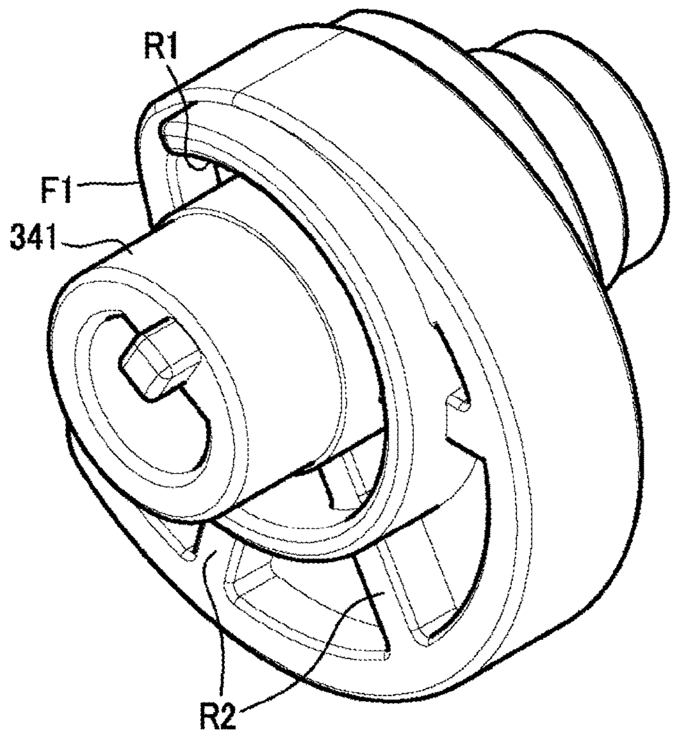
Figure 12:
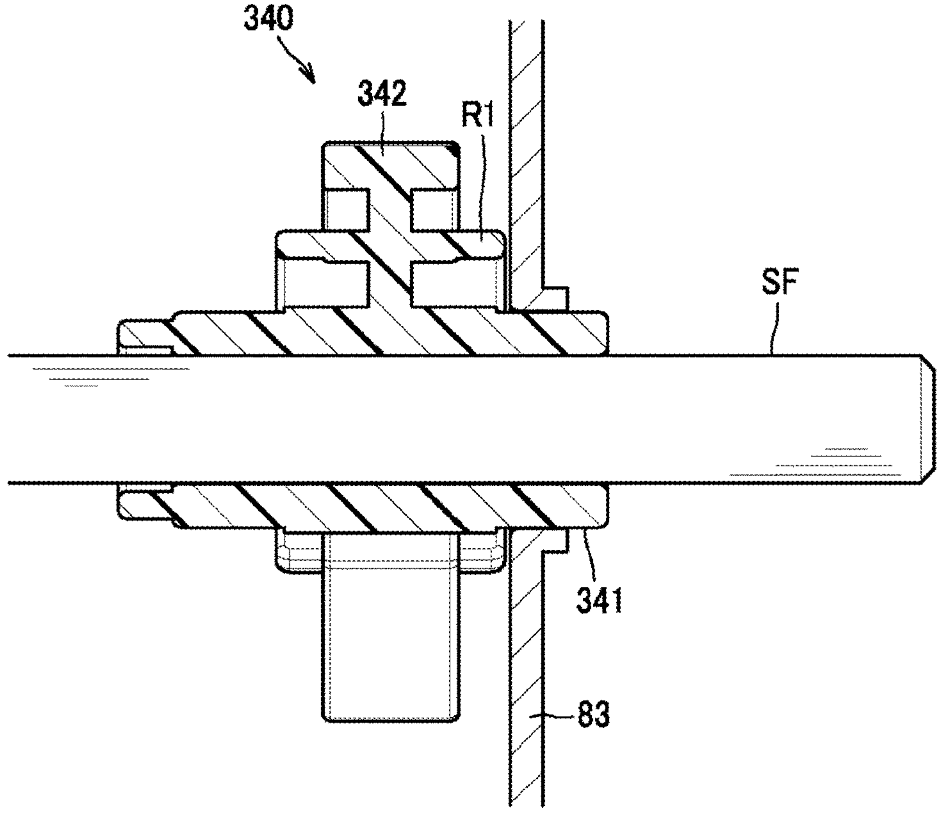
FIG. 12 is a section view showing a cam, a shaft, and a side frame as assembled together.

As shown in FIGS. 9A and 9B, the cam 340 comprises a tubular portion 341, an outer peripheral wall 342, a first rib R1 having a shape of a letter C, and a plurality of second ribs R2. The tubular portion 341 is, as shown in FIG. 12, a portion having a shape of a tube inside of which the shaft SF is disposed. The tubular portion 341 is rotatably supported at its outer surface by the side frame 83. Accordingly, the metal shaft SF is rotatably supported via the plastic tubular portion 341 by the metal side frame 83, so that two metal members are prevented from rubbing against each other.

Figure 10A:
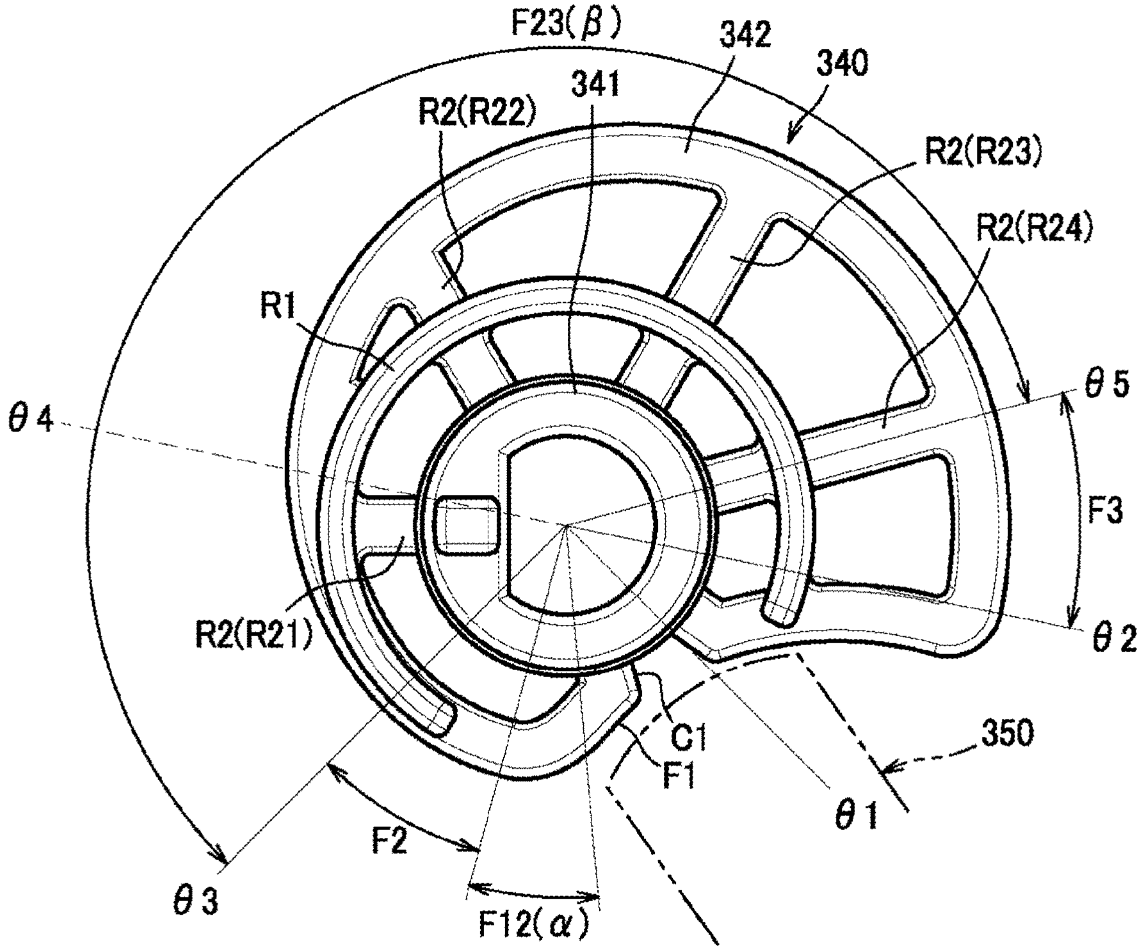
FIG. 10A is a side view of the cam.

As shown in FIGS. 9A and 9B, the outer peripheral wall 342 is disposed at a radially outer side of the tubular portion 341, and so formed as to surround the tubular portion 341. To be more specific, as shown in FIG. 10A, two ends of the outer peripheral wall 342 extending circumferentially around the tubular portion 341 are connected respectively to the tubular portion 341. The outer peripheral wall 342 has, at its outer surface (periphery), a first cam surface F12 and a second cam surface F23, in addition to the opposite surface F1, the first support surface F2 and the second support surface F3 described above. In FIG. 10A, each surface other than the opposite surface F1 is indicated by an angular range thereof.

The opposite surface F1 comprises a recessed area C1 sunk away from the cam follower 350. The recessed area C1 is recessed from the curved surface (the area curving inward to fit the contact surface Fa of the cam follower 350) of the opposite surface F1 farther deep toward the tubular portion 341. The first support surface F2 and the second support surface F3 span predetermined angular range areas, of which distances from the center of rotation of the cam 340 are constant, respectively. That is, the first support surface F2 and the second support surface F3 are each configured as a cylindrical surface of which the center of curvature coincides with the center of rotation of the cam 340. The distance from the second support surface F3 to the center of rotation of the cam 340 is greater than the distance from the first support surface F2 to the center of rotation of the cam 340.

The first cam surface F12 is contoured to change the nip pressure from the first pressure to the second pressure. The first cam surface F12 is located between the opposite surface F1 and the first support surface F2 in the circumferential direction of the cam 340. The first cam surface F12 is provided with its distance from the center of rotation of the cam 340 increasing gradually with distance from the opposite surface F1 toward the first support surface F2.

The second cam surface F23 is contoured to change the nip pressure from the second pressure to the third pressure. The second cam surface F23 is located between the first support surface F2 and the second support surface F3 in the circumferential direction of the cam 340. The second cam surface F23 is provided with its distance from the center of rotation of the cam 340 increasing gradually with distance from the first support surface F2 toward the second support surface F3.

Figure 10B:
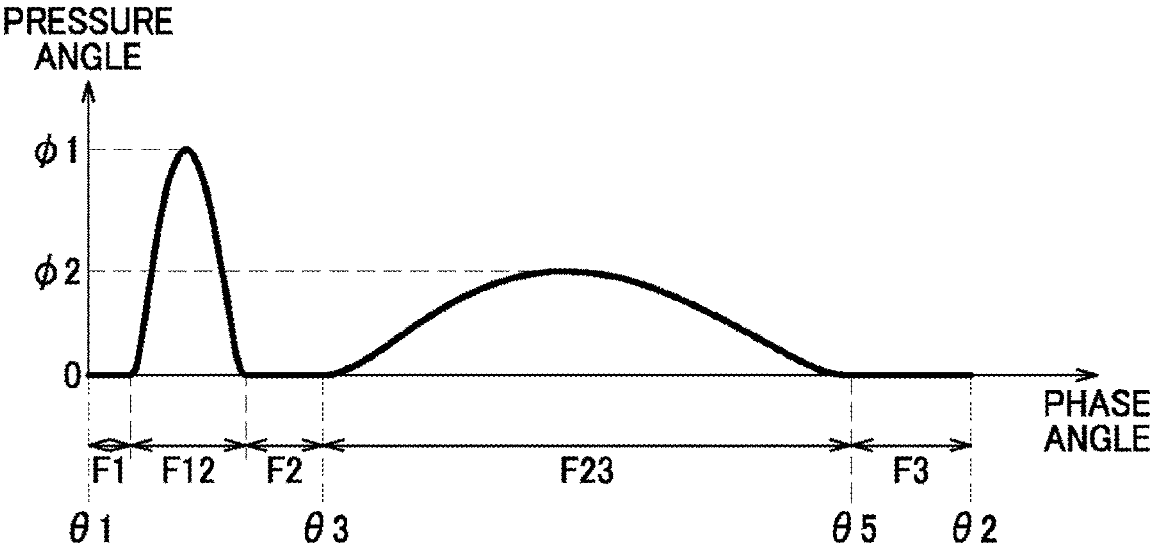
FIG. 10B is a graph showing the pressure angle varying in relation to the phase angle.

An angle of action $\beta$ of the second cam surface F23 is greater than an angle of action $\alpha$ of the first cam surface F12. FIG. 10B is a graph showing the pressure angle varying in relation to the phase angle, of the cam 340 as rotated from the first cam position to the third cam position. To be more specific, FIG. 10B shows the pressure angle varying in relation to the phase angle as exhibited when the cam 340 is rotated from a first phase angle $\theta$1 to a second phase angle $\theta$2 as shown in FIG. 10A.

The pressure angle herein refers to an angle formed by a direction of the force the periphery of the cam 340 receives at its contact point with the cam follower 350 from the cam follower 350 and a direction of a radial line of the cam 340 at the contact point between the periphery of the cam 340 and the cam follower 350. As shown in FIG. 10B, a maximum pressure angle $\varphi$2 at the second cam surface F23 is smaller than a maximum pressure angle $\varphi$1 at the first cam surface F12.

A third phase angle $\theta$3 shown in FIG. 10A represents a phase angle at which the periphery of the cam 340 in contact with the cam follower 350 changes from the first support surface F2 to the second cam surface F23. A fourth phase angle θ4 represents a phase angle at which a load imposed from the cam follower 350 on the second cam surface F23 changes greatly during the process of changing the nip pressure from the second pressure to the third pressure. A fifth phase angle θ5 represents a phase angle at which the periphery of the cam 340 in contact with the cam follower 350 changes from the second cam surface F23 to the second support surface F3.

Figure 11:
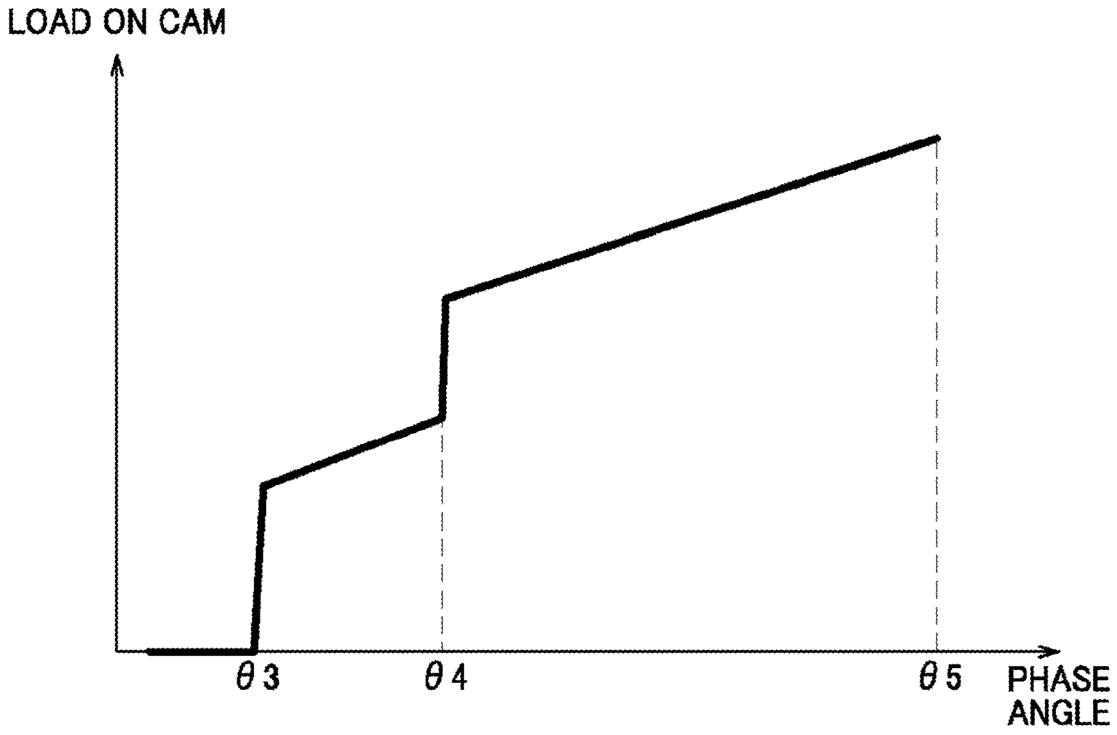
FIG. 11 is a graph showing the load exerted on the cam varying in relation to the phase angle.

During the process of rotation of the cam 340 from third phase angle θ3 to the fifth phase angle θ5, i.e., the process of changing the nip pressure from the second pressure to the third pressure, in the first stage, as described above, only the second spring 330 is caused to deform by the second cam surface F23, and the first spring 330 is, in the later stage, caused to deform by the second cam surface F23. Since the biasing force of the first spring 320 is greater than the biasing force of the second spring 330, the load imposed from the cam follower 350 on the second cam surface F23, as shown in FIG. 11, changes greatly before and after the cam 340 reaches the fourth phase angle θ4.

As shown in FIG. 10A, an angular distance between the third phase angle θ3 and the fourth phase angle θ4 is smaller than an angular distance between the fourth phase angle θ4 and the fifth phase angle θ5. Each of the angular ranges of the first support surface F2 and the second support surface F3 is greater than the angular range of the first cam surface F12. An angular distance between the first phase angle θ1 and the first cam surface F12 is greater than each of the angular ranges of the first support surface F2 and the second support surface F3.

The angular distances mentioned above may be set as follows.

The angular distance between the third phase angle θ3 and the fourth phase angle θ4 may for example be 60 degrees. The angular distance between the fourth phase angle θ4 and the fifth phase angle θ5 may for example be 150 degrees. In this example, the angle of action β of the second cam surface F23 is 210 degrees. The angle of action a of the first cam surface F12 may for example be 20 degrees.

Similarly, the angular distance between the first phase angle θ1 and the first cam surface F12 may for example be 40 degrees. The angular range of the first support surface F2 may for example be 30 degrees. The angular range of the second support surface F3 may be approximately 26%, for example.

As shown in FIGS. 9A and 9B, the first rib R1 is a rib extending in a shape of a segment of a circle of which a center coincides with the center of rotation of the cam 340. The first rib R1 is located radially inside of the outer periphery of the outer peripheral wall 342 and radially inside of the tubular portion 341, i.e., between the outer periphery of the outer peripheral wall 342 and the tubular portion 341. The first rib R1 protrudes beyond both ends of the outer peripheral wall 342 in an axial direction of the cam 340. Accordingly, as shown in FIG. 12, the first rib R1 forms extreme ends of the cam 340 facing in the axial direction, and thus is contactable with the adjacent side frame 83. As the first rib R1 contacts the side frame 83, the cam 340 is restrained from moving in the axial direction.

The plurality of second ribs R2 extend in radial directions of the cam 340 and are arranged apart from each other in a circumferential direction of the cam 340 within a range of the second cam surface F23. Each of the second ribs R2 connects at least two portions of the tubular portion 341, the first rib R1, and the outer peripheral wall 342 together, so that the connected portions are united in one piece.

As shown in FIG. 10A, distances in the circumferential direction between the plurality of second ribs R2, i.e., angular distances between adjacent second ribs R2, decrease with increase in radius of the cam 340. In other words, an angular distance between adjacent second ribs R2 provided in a sector having longer radii of the cam 340 is smaller than an angular distance between adjacent second ribs provided in a sector having shorter radii of the cam 340. In this example, four second ribs R2 are provided, and designated by reference characters R21, R22, R23 and R23 in the order of contact made with the cam follower 350 when the cam 340 rotates in the counterclockwise direction as in the drawings from the first cam position to the third cam position.

The angle formed (angular distance) between the second rib R21 and the second rib R22 is greater than the angle formed (angular distance) between the second rib R22 and the second rib R23. The angle formed between the second rib R22 and the second rib R23 is greater than the angle formed (angular distance) between the second rib R23 and the second rib R24.

In the illustrative, non-limiting embodiment described above, the following advantageous effects can be achieved.

Since the second cam surface F23 on which is exerted a biasing force greater than that exerted on the first cam surface F12 has an angle of action β greater than an angle of action α of the first cam surface F12 and a maximum pressure angle φ2 smaller than a maximum pressure angle φ1 provided at the first cam surface F12, the great biasing force of the first spring 320 can be restrained from acting on the cam 340 in such a direction as to cause the cam 340 to rotate. Therefore, undesirable advance of the cam surface by the biasing force of the first spring 320 can be restrained.

Since the opposite surface F1 of the cam 340 comprises a curved surface contoured to fit the protuberant surface (contact surface Fa) of the cam follower 350, and thus comprises a recessed area, the angles of action of the first cam surface F12 and the second cam surface F23 can be made greater without increasing the maximum radial dimension or maximum diameter of the cam 340, as compared with an alternative configuration in which the opposite surface is not configured to be a curved surface. Therefore, undesirable upsizing of the fixing device 8 can be restricted, and the second fixing member 82 can be moved smoothly by the cam 340.

Since the first rib R1 protruding in the axial direction of the cam 340 to be contactable with the side frame 83 is configured to extend in the shape of a segment of a circle of which a center coincides with the center of rotation of the cam 340, a slide region of the side frame 83 getting in sliding contact with the first rib R1 when the cam 340 rotates can be restricted to a narrow annular area corresponding to the width of the first rib R1, and the frictional force between the cam 340 and the side frame 83 can be reduced accordingly, so that the cam 340 can be rotated smoothly.

Since the shaft SF is supported via the tubular portion 341 of the cam 340 by the side frame 83, the sliding contact between the shaft SF and the side frame 83 can be restricted.

Since the plurality of the second ribs R2 are arranged such that the angular distances between adjacent second ribs R2 decrease with increase in radius of the cam 340, the great biasing force from the first spring 320 can be firmly supported by the cam 340. To be more specific, since the portion of the cam 340 with greater radius is subjected to a greater biasing force from the first spring 320, smaller angular distance between the second ribs R2 at this portion can serve to make the cam 340 capable of firmly supporting the great biasing force from the first spring 320.

The above-described embodiment may be implemented in various other forms as described below.

The illustrated configuration for the first spring 320 to bias the second fixing member 82 toward the first fixing member 81 may not be essential. Alternatively, the first spring may be arranged to bias the first fixing member toward the second fixing member. In this alternative configuration, the cam may be configured to cause the first fixing member to move against the biasing force of the first spring.

In other words, one of the first fixing member and the second fixing member may comprise a movable member, and the other of the first fixing member and the second fixing member may comprise a stationary member, such that the movable member is configured to be movable relative to the stationary member, and the first spring may be arranged to bias the movable member toward the stationary member, and the cam may be rotatably arranged to cause the movable member to move against the biasing force of the first spring.

The pressure control mechanism 300 comprising the first spring 320 and the second spring 330 are described above, but the second spring 330 may be not be provided in the pressure control mechanism. In this alternative configuration, the cam follower 350 may also be omitted, and the cam 340 may be configured to push the arm body 311 directly. Moreover, a spring directly biasing the movable member (i.e., one of the first fixing member and the second fixing member) toward the stationary member (i.e., the other of the first fixing member and the second fixing member) without using an arm or other intervening member may also be adoptable.

The image forming apparatus may not be a laser printer, and may be a printer with an LED-type exposure device, a copier, a multifunction machine, or the like.

The first spring and the second spring may not be a helical spring as described above, and a torsion spring, a leaf spring, etc. may be used, instead.

Although the fixing device 8 described above uses a heater 110, the fixing device which uses no heater may also be feasible. The fixing device may be a device configured to apply light to the nip region to thereby fix a developer image onto a sheet.

A halogen lamp illustrated as an example of a heater may be substituted, for example, by a carbon heater.

Although the upstream pad P1 and the downstream pad P2 described above are both made of rubber, the pads may be made, for example, of plastic, metal or other hard material resistant to deformation even under pressure.

The support member is exemplified by the holder 140 and the stay 200 in the above description, but the support member may be made up of a holder only, or of a stay only. Alternatively, a holder and a stay may be configured as a monolithic member.

Although the first fixing member is exemplified by the tubular roller in which the heater 110 is disposed, the first fixing member may be a pressure roller comprising a shaft and a rubber layer formed around the shaft. An endless belt of which an inner side is heated by a heater may also be used, instead. An external heating scheme in which a heater is disposed outside the first fixing member to heat an outer surface of the first fixing member, or an induction heating scheme known in the art may also be adopted. Another alternative configuration in which a heater is provided in the second fixing member to indirectly heat the first fixing member in contact with the outer periphery of the second fixing member may also be feasible. Each of the first fixing member and the second fixing member may be configured to incorporate a heater. The second fixing member may also be configured as a pressure roller comprising a shaft and a rubber layer formed around the shaft.

The elements described in the above embodiment and its modified examples may be implemented selectively and in combination.

What is claimed is:

1. A fixing device comprising:
- a first fixing member;
- a second fixing member including a nip-forming member, and belt, to form a nip in combination with the first fixing member; and
- a pressure control mechanism capable of switching a condition of the nip to a large nip condition and to a small nip condition, a width of a nip in the small nip condition being smaller than a width of a nip in the large nip condition in a direction of conveyance of a sheet, the pressure control mechanism comprising:
  - an arm capable of providing a pressure at the nip;
  - a spring producing a biasing force that enables the arm to exert the pressure; and
  - a cam configured to be rotatable and capable of causing the arm to move against the biasing force, the cam having a cam surface of which distances from a center of rotation of the cam vary in a circumferential direction;
- wherein the cam surface of the cam corresponding to the small nip condition is located at a constant distance from the center of the rotation of the cam, and
- wherein the condition of the nip is changed from the large nip condition to the small nip condition by the cam rotating by an angle of 180 degrees or greater in the first direction, and the condition of the nip is changed from the small nip condition to the large nip condition by the cam rotating by an angle of 180 degrees or greater in the second direction.

2. The fixing device according to claim 1, wherein a downstream end of the nip in the small nip condition as defined in a moving direction of the belt, is located upstream, in the moving direction, of a center of the nip in the large nip condition as defined in the moving direction.

3. The fixing device according to claim 1, further comprising a side frame configured to support the first fixing member,
- wherein the cam comprises:
  - a tubular portion rotatably supported on the side frame; and
  - a rib configured to contact the side frame in an axial direction of the cam.

4. The fixing device according to claim 3, wherein the rib extends in a segment of a circle as viewed in the axial direction.

5. A fixing device comprising:
- a first fixing member;
- a second fixing member including a nip-forming member, and belt, to form a nip in combination with the first fixing member; and
- a pressure control mechanism capable of switching a condition of the nip to a large nip condition and to a small nip condition, a width of a nip in the small nip condition being smaller than a width of a nip in the large nip condition in a direction of conveyance of a sheet, the pressure control mechanism comprising:
  - an arm made of metal capable of providing a pressure at the nip;

a spring producing a biasing force that enables the arm to exert the pressure; and a cam configured to be rotatable and capable of causing the arm to move against the biasing force, the cam having a cam surface of which distances from a center of rotation of the cam vary in a circumferential direction;

wherein the arm comprises a cam follower made of plastic and contactable with the cam, wherein the cam follower has a contact surface contactable with the cam, the contact surface comprising a protuberant curved surface bulging toward the cam, wherein the cam comprises an opposite surface and a support surface, such that when the condition of the nip is the large nip condition, the opposite surface faces the cam follower and is kept out of contact with the cam follower, while when the condition of the nip is the small nip condition, the support surface contacts and supports the cam follower, wherein the opposite surface has a concave curved surface contoured to match the contact surface of the cam follower, and wherein a distance from the center of rotation of the cam to the support surface is constant.

6. The fixing device according to claim 5, wherein the condition of the nip is changed from the small nip condition to the large nip condition by the cam rotating by an angle of 180 degrees or greater in a first direction.

7. The fixing device according to claim 5, wherein the concave curved surface is contoured to sink away from the cam follower.

8. The fixing device according to claim 5, wherein the cam follower is movable relative to the arm in a radial direction of the cam.

9. The fixing device according to claim 5, further comprising a side frame configured to support the first fixing member, wherein the cam comprises:

a tubular portion rotatably supported on the side frame; and a rib configured to contact the side frame in an axial direction of the cam.

10. The fixing device according to claim 9, wherein the rib extends in a segment of a circle as viewed in the axial direction.

11. A fixing device comprising:

a first fixing member;

a second fixing member including a nip-forming member, and a belt, to form a nip in combination with the first fixing member; and a pressure control mechanism capable of switching a condition of the nip to a large nip condition and to a small nip condition, a width of a nip in the small nip condition being smaller than a width of a nip in the large nip condition in a direction of conveyance of a sheet, the pressure control mechanism comprising:

an arm capable of providing a pressure at the nip;

a spring producing a biasing force that enables the arm to exert the pressure; and a cam configured to be rotatable and capable of causing the arm to move against the biasing force, the cam having a cam surface of which distances from a center of rotation of the cam vary in a circumferential direction;

wherein a downstream end of the nip in the small nip condition as defined in a moving direction of the belt, is located upstream, in the moving direction, of a center of the nip in the large nip condition as defined in the moving direction.

12. The fixing device according to claim 11, wherein the condition of the nip is changed from the small nip condition to the large nip condition by the cam rotating by an angle of 180 degrees or greater in a first direction.

13. The fixing device according to claim 11, further comprising a side frame configured to support the first fixing member, wherein the cam comprises:

a tubular portion rotatably supported on the side frame; and a rib configured to contact the side frame in an axial direction of the cam.

14. The fixing device according to claim 13, wherein the rib extends in a segment of a circle as viewed in the axial direction.

* * * * *